(No Model.) 2 Sheets—Sheet 1.

C. MATTHEWS.
CAR BRAKE.

No. 561,414. Patented June 2, 1896.

WITNESSES:
W. E. Elbers
C. L. Reese

INVENTOR
Charles Matthews
BY
Henry C. Evert
ATTORNEY.

(No Model.)                                                                 2 Sheets—Sheet 2.

C. MATTHEWS.
CAR BRAKE.

No. 561,414.                                              Patented June 2, 1896.

WITNESSES:

INVENTOR
Charles Matthews
BY Henry C. Evert
ATTORNEY.

UNITED STATES PATENT OFFICE.

CHARLES MATTHEWS, OF IRWIN, PENNSYLVANIA.

CAR-BRAKE.

SPECIFICATION forming part of Letters Patent No. 561,414, dated June 2, 1896.

Application filed May 16, 1895. Serial No. 549,553. (No model.)

*To all whom it may concern:*

Be it known that I, CHARLES MATTHEWS, a citizen of the United States of America, residing at Irwin, in the county of Westmoreland and State of Pennsylvania, have invented certain new and useful Improvements in Car-Brakes, of which the following is a specification, reference being had therein to the accompanying drawings.

This invention relates to certain new and useful improvements in brakes for cars, and has for its object the provision of novel means whereby a car may be readily brought to a standstill.

The invention has also for its object to provide novel means whereby the brake is applied to the top of the rail and to the side of the same, thus obtaining a large bearing-surface and a more effectual grasp.

The invention has for its still further object to construct a brake that will be strong, durable, and comparatively inexpensive to manufacture; furthermore, one that will be highly efficient in its operation.

With the above and other objects in view the invention finally consists in the novel construction, combination, and arrangement of parts to be hereinafter more specifically pointed out in the claims.

In describing the invention in detail reference is had to the accompanying drawings, forming a part of this specification, and wherein like figures of reference indicate similar parts throughout the several views, in which—

Figure 1:
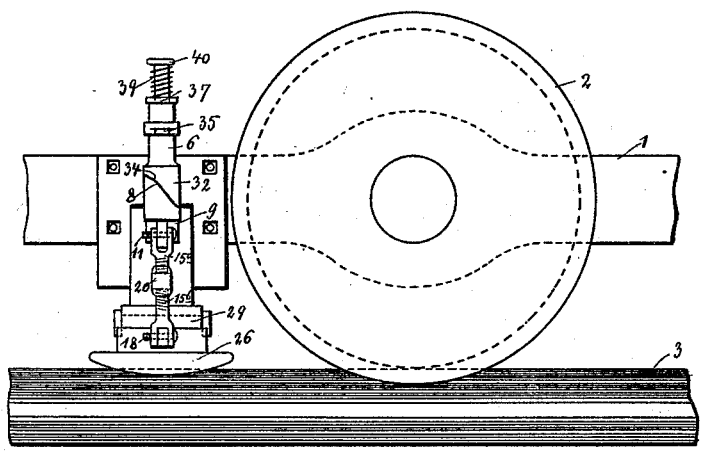
Figure 2:
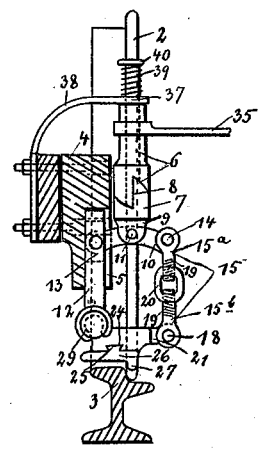
Figure 3:
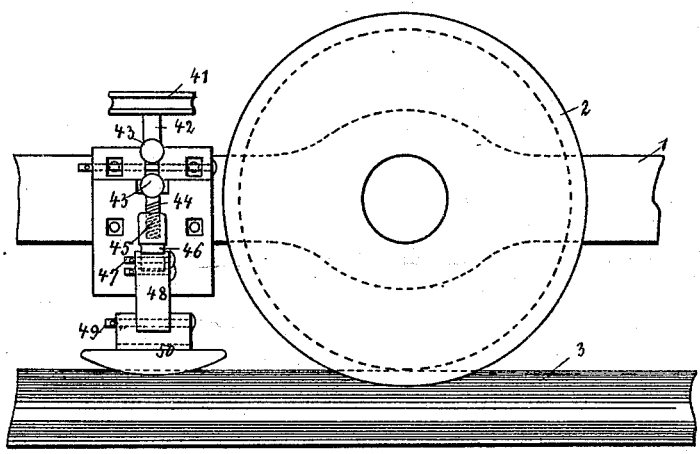
Figure 4:
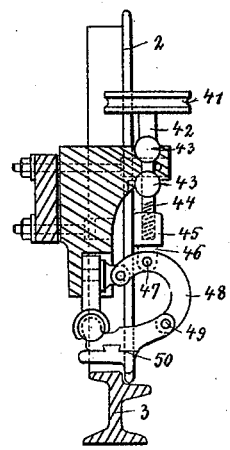

Figure 1 is a side elevation of a section of a truck with my improved brake attached thereto. Fig. 2 is a front view, partly in section, of the same. Fig. 3 is a side elevation of the same, showing a modification. Fig. 4 is a front elevation of the same, partly in section. Fig. 5 is a side view of the sleeve provided with the upper worm. Fig. 6 is an underneath plan view of the same. Fig. 7 is a side elevation of the operating-shaft. Fig. 8 is a top plan view of the same. Fig. 9 is a side elevation of the operating-shaft, showing the same in a different position. Fig. 10 is a side view of a section of the connecting-lever. Fig. 11 is a front view of the same. Fig. 12 is a side view of the brake-shoe. Fig. 13 is a plan view of the same. Fig. 14 is a front view of the buckle. Fig. 15 is a side view of the same. Fig. 16 is a side view of a modified form of operating-shaft. Fig. 17 is a side view of the supporting-plate. Fig. 18 is a front view of the same.

In the drawings, 1 indicates the car-truck, 2 the wheel, and 3 the rail.

The reference-figure 4 represents the base-plate, attached to the truck in any suitable manner. Said base-plate is vertically slotted and forms a guide 5.

The operating-shaft 6 is provided at its lower extremity with a shoulder 7, forming a worm-screw 8. The end of said shaft is forked at 9 and adapted to receive the lever-arm 10, which is centrally fulcrumed thereto by means of a pin 11. The lever-arm 10 is pivotally connected to the supporting-plate 12, and is adapted to operate in a vertical slot 13, formed in said plate. To the opposite end of the lever-arm is pivotally secured, by means of a pin 14, the connecting-lever 15, said lever being composed of two sections 15ª and 15ᵇ. Said sections are provided with forked ends 16 and apertures 17 for the reception of the pins 14 and 18. Said sections carry on their opposite ends screw-threads 19 and are connected together by means of a link-buckle 20.

The lower forked end of the connecting-lever is adapted to engage a projecting lug 21 of the brake-shoe carrier 22, and is pivotally connected thereto by means of a pin 18 passing through the apertures 17 of the connecting-lever and aperture 23 of the lug 21.

The brake-shoe carrier 22 is longitudinally slotted at 24 on its underneath face, said slot being in shape of a dovetail, which is adapted to receive the dovetail 25, formed on the upper face of the brake-shoe 26. The said brake-shoe is further provided on its underneath side with a flange 27, the latter being adapted to press against the side of the rail.

On the upper face of the brake-shoe carrier is rigidly secured a bolt 28, the latter being so formed as to fit in a journal 29, and is held in position by a screw 30, designed to fit the screw-threaded aperture of the bolt 28. The brake-shoe carrier is further provided with a shoulder 31, extending longitudinally and forming a seat for the journal 29, the latter being integral with the supporting-plate 12, the said plate reciprocating in a guide 5 of the base-plate 4.

The reference-number 32 indicates a sleeve having a shoulder 33 and carries a worm-screw thread 34. Said sleeve fits over the operating-shaft 6 and carries an operating-lever 35, the vertical shaft 6 passing through an aperture 37 of the retaining-plate 38. A spiral spring 39 encircles the vertical shaft 6, and is held in position by means of a washer 40 and operating against the retaining-plate 38.

In Figs. 3 and 4 of the drawings a modification of my improved brake and attachments is shown, this illustrating more clearly another mode of operation, the principle remaining the same. A wheel 41 carries a vertical shaft 42, having ball-bearings 43 and formed with screw-threads 44, operating in a screw-threaded collar 45, provided with a lug 46, pivotally attached at 47 to the U-shaped lever-arm 48, provided with a knuckle-joint 49, forming at its lower extremity a brake-shoe carrier 50.

The operation of the brake is as follows: When it is desired to check the momentum of the car, the operating-lever is operated in any suitable manner, thereby operating the worm-screw, which will tend to press downwardly the lever-arm carrying the connecting-lever and supporting-plate having attached thereto the shoe-carrier, and thereby communicating motion to the brake-shoe, forcing the latter against the top face of the rail. The brake being further depressed will tend to engage the flange of the brake-shoe with the side of the rail. By this means a more effectual engagement with the rail is secured and a larger bearing-surface is obtained. When the brake is applied, the spiral spring is depressed, and as the brake is released the spiral spring will serve to return the brake to its normal position, as shown in Figs. 1 and 2 of the drawings.

It will be noted that the brake may be readily applied to the rail, it requiring only a slight turn of the lever to accomplish the same, another important feature being that the brake-shoe is forced against the side of the rail as well as the top thereof. A great saving of the brake-shoes is accomplished by the use of my improved brake, as the brake-shoes when worn may be adjusted by means of the link-buckle and pivotal connection of the lever-arm to the supporting-plate, so that every portion thereof may be utilized, as will be readily apparent. The brake is preferably attached in close proximity to the wheel in order that it may effectually operate when it is desired to apply the brake as the car is traveling over abrupt curves or loops.

It will be noted that various changes may be made in the details of construction of my improved brake without departing from the general spirit of the invention.

Having fully described my invention, what I claim as new, and desire to secure by Letters Patent, is—

1. A car-brake consisting of a brake-shoe carrier and a brake-shoe, means for operating the brake-shoe vertically and in combination a connection for tilting the brake-shoe laterally, for the purpose described.

2. A car-brake consisting of a brake-shoe carrier, a brake-shoe having a downwardly-extending flange, a lever for operating the brake-shoe vertically and in combination an adjustable connection between the lever and brake-shoe, whereby the brake-shoe is tilted laterally for the purpose described.

3. In a car-brake the combination of an operating-shaft, carrying a worm-screw, a lever-arm connected to the lower end of the shaft, a brake-shoe carrier having connection with the lever-arm whereby the brake is given a vertical and lateral movement, for the purpose described.

4. In a brake the combination of a shaft, a suitably-supported brake-shoe having a vertical and lateral movement, and a lever connected with the shaft and brake-shoe in a manner to equalize the power for the purpose described.

5. In a car-brake, the combination of an operating-shaft carrying a worm-screw, a lever operating the shaft, a lever-arm connected to the lower end of the shaft, a connecting-lever extending from the lever-arm, a brake-shoe carrier having connection with the lever-arm, and a brake-shoe carrying a flange on its underneath face, as and for the purpose specified.

6. In a car-brake the combination with the operating-shaft carrying a screw, a lever-arm connected with the shaft, a supporting-plate and connecting-lever connected to the lever-arm, a brake-shoe carrier, joined to the lever-arm and brake-shoe, an operating-lever and a spring adapted to normally elevate the brake-shoe as described.

7. In a car-brake the combination of an operating-shaft and lever, a sleeve and worm-screw, a lever-arm connected with the shaft, a supporting-plate connected to the lever-arm a connecting-lever composed of two sections joined by a link-buckle, said lever being joined to the lever-arm, a brake-shoe carrier, a brake-shoe removably attached thereto and a spring on the shaft to normally elevate the brake-shoes as described.

In testimony whereof I affix my signature in presence of two witnesses.

CHARLES MATTHEWS.

Witnesses:
H. C. EVERT,
H. E. SEIBERT.